(12) United States Patent
Srinivas et al.

(10) Patent No.: US 8,264,978 B1
(45) Date of Patent: Sep. 11, 2012

(54) SYSTEM AND METHOD FOR OPERATING A WIRELESS COMMUNICATION SYSTEM TO PROCESS PACKET PAYLOADS TO DETERMINE RF SIGNAL ADJUSTMENTS

(75) Inventors: Shilpa Kowdley Srinivas, Herndon, VA (US); Anoop Kumar Goyal, Overland Park, KS (US); Bhagwan Singh Khanka, Lenexa, KS (US); John W. Prock, Peculiar, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 221 days.

(21) Appl. No.: 12/572,797

(22) Filed: Oct. 2, 2009

(51) Int. Cl.
*H04L 12/26* (2006.01)
(52) U.S. Cl. ...... 370/252; 370/338; 370/465; 455/562.1
(58) Field of Classification Search .................. 370/252, 370/253, 328–334, 338, 465, 468; 455/422, 455/423, 560, 561, 562.1
See application file for complete search history.

(56) References Cited

U.S. PATENT DOCUMENTS

| | | | | |
|---|---|---|---|---|
| 6,141,565 A | * | 10/2000 | Feuerstein et al. | 455/560 |
| 2004/0214577 A1 | * | 10/2004 | Borst et al. | 455/446 |
| 2006/0068849 A1 | | 3/2006 | Bernhard et al. | |
| 2006/0229048 A1 | | 10/2006 | Carroll et al. | |
| 2010/0248643 A1 | * | 9/2010 | Aaron et al. | 455/68 |
| 2010/0315950 A1 | * | 12/2010 | Venkataraman et al. | 370/235 |

* cited by examiner

*Primary Examiner* — Pao Sinkantarakorn

(57) ABSTRACT

Various systems and methods are provided to manage and operate a wireless communication system. A processing system receives an application data flow from a wireless device located in a sector of a base station. The application data flow comprises a plurality of data packets. At least one of the data packets is inspected for an attribute. Also, an application data flow characteristic is measured for the application data flow. The processing system evaluates the attribute and the application data flow characteristic against a network policy associated with the wireless device. When the attribute and the application data flow characteristic meet the network policy, the processing system provides a wireless communication adjustment notification to the base station.

10 Claims, 6 Drawing Sheets

SYSTEM AND METHOD FOR OPERATING A WIRELESS COMMUNICATION SYSTEM TO PROCESS PACKET PAYLOADS TO DETERMINE RF SIGNAL ADJUSTMENTS

TECHNICAL BACKGROUND

Wireless communication is a growing means for accessing a network and provides certain advantages over wired communications for accessing networks. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

With the growth in wireless networks, new and advanced applications have been introduced for use on wireless devices. Through these advances with wireless devices, wireless communication networks need to adapt to the ever growing demand for wireless resources. For example, many wireless devices now allow for the use of high-bandwidth applications such as video streaming, file sharing, and voice over IP services just to name a few. As these new applications become more prevalent, wireless network operators and manufacturers must be prepared to handle the demands that are being placed on their resources.

OVERVIEW

In various embodiments, systems and methods are provided to manage and operate a wireless communication system. In an embodiment, a processing system receives an application data flow from a wireless device located in a sector of a base station. The application data flow comprises a plurality of data packets. At least one of the data packets is inspected for an attribute. Also, an application data flow characteristic is measured for the application data flow. The processing system evaluates the attribute and the application data flow characteristic against a network policy associated with the wireless device. When the attribute and the application data flow characteristic meet the network policy, the processing system provides a wireless communication adjustment notification to the base station.

DETAILED DESCRIPTION

In an embodiment, a deep packet inspection (DPI) system processes application data and provides control instructions to wireless network elements to alter the wireless coverage based upon the application data, the wireless device using the application and other configurable parameters. FIGS. 1-6 and the following description depict specific embodiments in greater detail that teaches those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
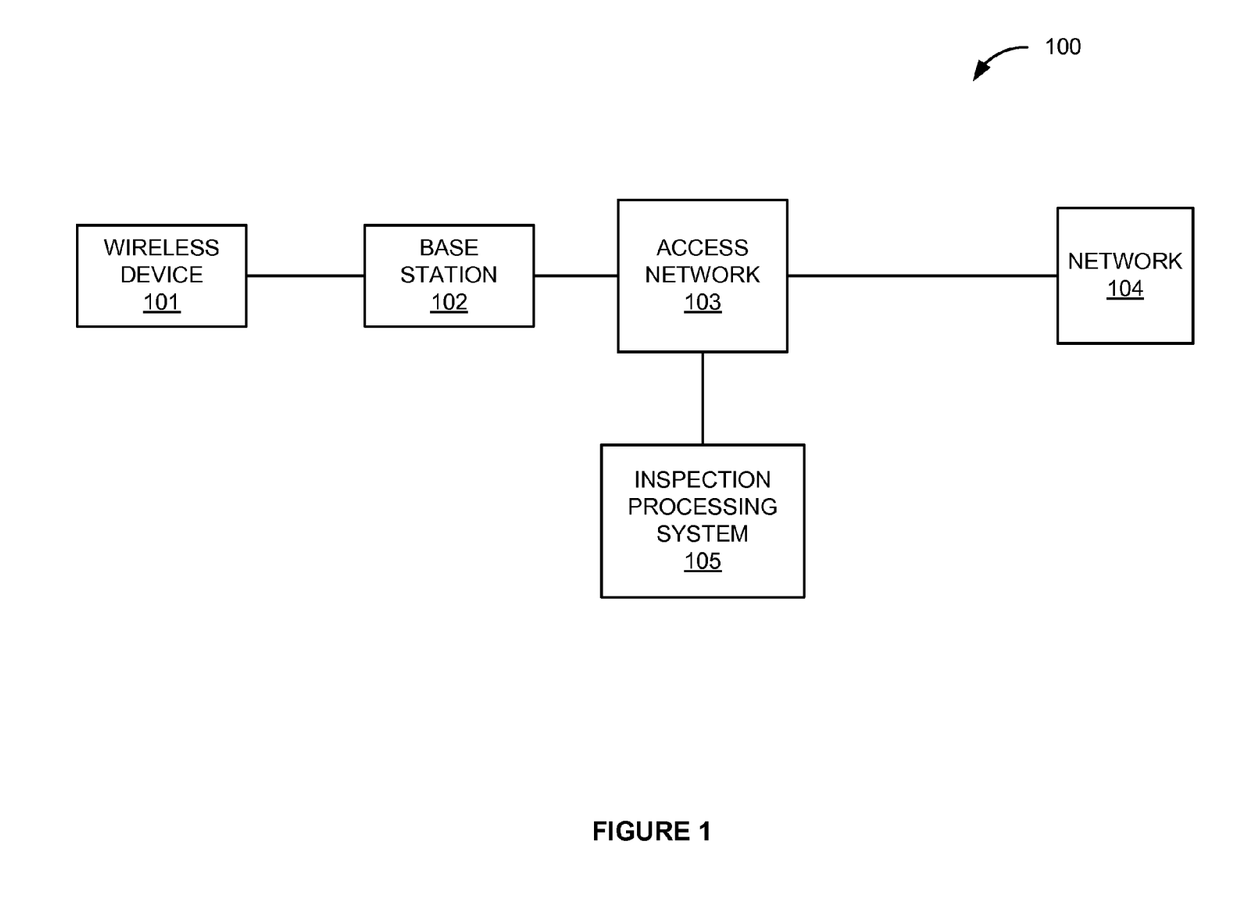
FIG. 1 is a block diagram illustrating a wireless communication system.

FIG. 1 is a block diagram illustrating wireless communication system 100. Wireless communication system comprises wireless device 101, base station 102, access network 103, network 104 and inspection processing system 105. Wireless device exchanges information with base station 102, base station exchanges information with access network 103, and access network 103 exchanges information with network 104. This allows wireless device 101 to communicate with other users, applications and devices that are available through communicating through network 104. Additionally, inspection processing system 105 receives and sends information with access network 103 and thereby can exchange information with wireless device 101, base station 102 and network 104. Although inspection processing system 105 is shown to be in communication with access network 103, inspection processing system 105 may communicate directly with any network element in the communication path between wireless device 101 and network 104.

Figure 2:
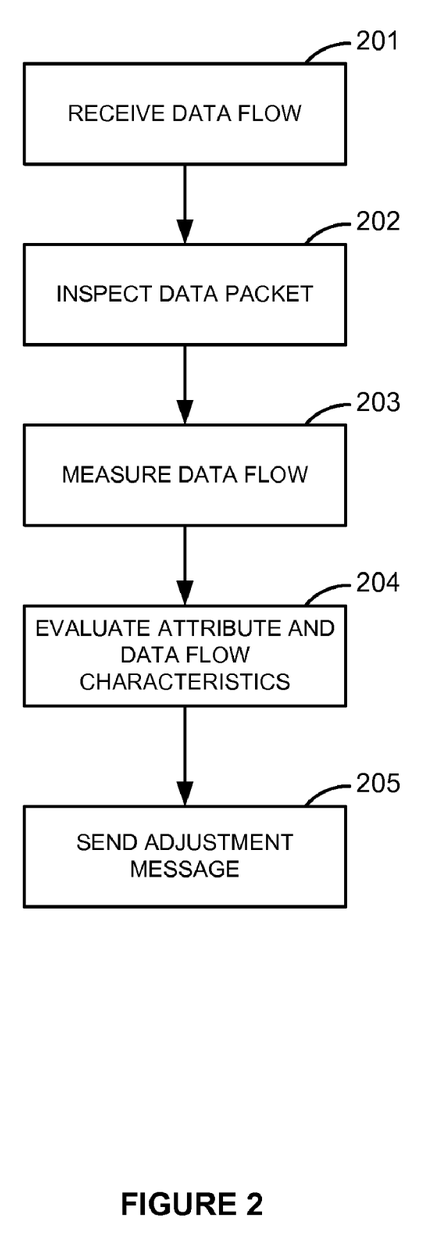
FIG. 2 is a flow diagram illustrating a method of operating a wireless communication system.

In operation, FIG. 2 is a flow diagram illustrating a method of operating wireless communication system 100. Inspection processing system 105 receives an application data flow that originated with wireless device 101 that is sent via base station 102 (201). An application data flow can be any one-way or two-way data communication between wireless device 101 and network 104 that provides communication access to other users, applications and devices. Examples of these application flows may include but are not limited to telephone service, long distance service, mobile voice service, mobile data service, push-to-talk service, internet service, web browsing, email, peer-to-peer file sharing, pictures, picture messaging, video, video messaging, audio, voicemail, music, MP3's, ring tones, stock tickers, news alerts, and so on.

The application data flow comprises a plurality of data packets where each of the data packets may have application signatures or attributes that are associated with the data packet. For example, a data packet typically contains multiple header information and payload data that is associated with the headers. Within the payload of the data packets, attributes exist that provide information on the type of application that the data packet is associated with. For example, the data packet may include one or more of: (1) a user indicator that is associated with a user of the wireless device; (2) an application indicator that is associated with an application that originated the data packet; (3) a device indicator that is associated with a wireless device that originated or is going to receive the data packet; and, (4) a base station indicator that is associated with a wireless network resource that will, or has, carried the data packet. Additional attributes may also be included.

The location of wireless device 101 may be obtained using any number of techniques that is then passed on to inspection processing system 105. These techniques may include using global positioning system (GPS) data, cell tower triangulation data, call measurement data, pilot strength measurement data and other data that would allow the base station to communicate the location of wireless device 101 to inspection processing system 105. The location data may be passed to inspection processing system 105 through the application data flows themselves through the use of attributes discussed above.

Inspection processing system 105 performs a data packet inspection process on at least one of the data packets for at least one attribute from the application data flow (202). Also, inspection processing system 105 measures an application data flow characteristic of the application data flow (203). An application data flow characteristic may include a throughput rate through a network element or a data flow usage over a period of time (megabytes per month) through a network element.

Inspection processing system 105 evaluates the attribute and the application data flow characteristic against a network policy (204). The network policy may be associated with a particular type of application, with a service level agreement for a user, or with a profile for a wireless device.

Examples of network policies associated with an application could include a policy for a voice over internet protocol (VoIP) application, a peer-to-peer file sharing application, a web-browsing application, and any other application that may be run from a wireless device. Service level policies or agreements may be, for example, associated with a throughput rate cap that limits a wireless device or user, associated with a total amount of data (e.g., Gigabytes per month) that a wireless device or user is allowed to receive (or send) over a given time period, or associated with an amount of data a wireless device or user may use for a particular type of application (i.e. a user policy may limit the use of an application so that no more than 10% of that data can be associated with a certain application).

A quality of service (QoS) profile associated with a user account utilizing the communication system is another example of a network policy that may be evaluated by inspection processing system 105. A user account may include any information about a subscriber utilizing the communication system illustrated in FIG. 1. Examples of subscriber information would include identity information, the type of subscription plan or contract, credit information, and other information that would be typically associated with a wireless subscription with a network operator. The user account could also include a QoS profile for the user account. The QoS profile comprises permissions and restrictions for use of the communication system or network for the user to utilize services on the network. Criteria that may be analyzed for determining a QoS profile include throughput, packet error rate, delay and jitter that may be associated with the use of an application on the network. Network operators may utilize QoS profiles to establish levels of service for their subscribers. For example, one measure that may be utilized is a bandwidth parameter, criteria or threshold that would determine the permitted use of a network's resources by a user's application.

When the attribute and application data flow characteristic meet the network policy, inspection processing system 105 sends a wireless communication adjustment notification message to base station 102 (205). This notification message instructs base station 102 to make adjustments to the RF signal or coverage area serving wireless device 101. This allows wireless device 101 to receive enhanced or diminished wireless service depending upon the network policy being enforced.

One example of adjusting the RF conditions serving wireless device 101 is altering the antenna patterns in a coverage area. This may include altering the antenna vertically, the antenna's tilt, or altering the antenna horizontally, the antenna's azimuth, or a combination of both. Adjustments to the antenna may be made mechanically or electrically. For example, the antenna may be physically moved to alter its tilt and/or azimuth settings. Alternatively, electrical beam adjustment may be utilized to adjust the tilt and azimuth settings.

Further, adjustments may be made to the antenna from a location remote to the physical location of the antenna that may be residing atop a tower. Remote electrical tilt (RET) and remote azimuth tile (RAT) are examples of adjusting the antenna's tilt and azimuth settings from a location different from the antenna's location.

Another example of adjusting the RF conditions serving wireless device 101 is utilizing adaptive antenna arrays or smart antennas. Adaptive antenna arrays have the ability to calculate beamforming vectors to track and locate the antenna beam on a wireless device. Through the use of these antenna arrays, network operators have the ability to direct the appropriate level of wireless services to a particular wireless device utilizing the data packet processes described above.

Figure 3:
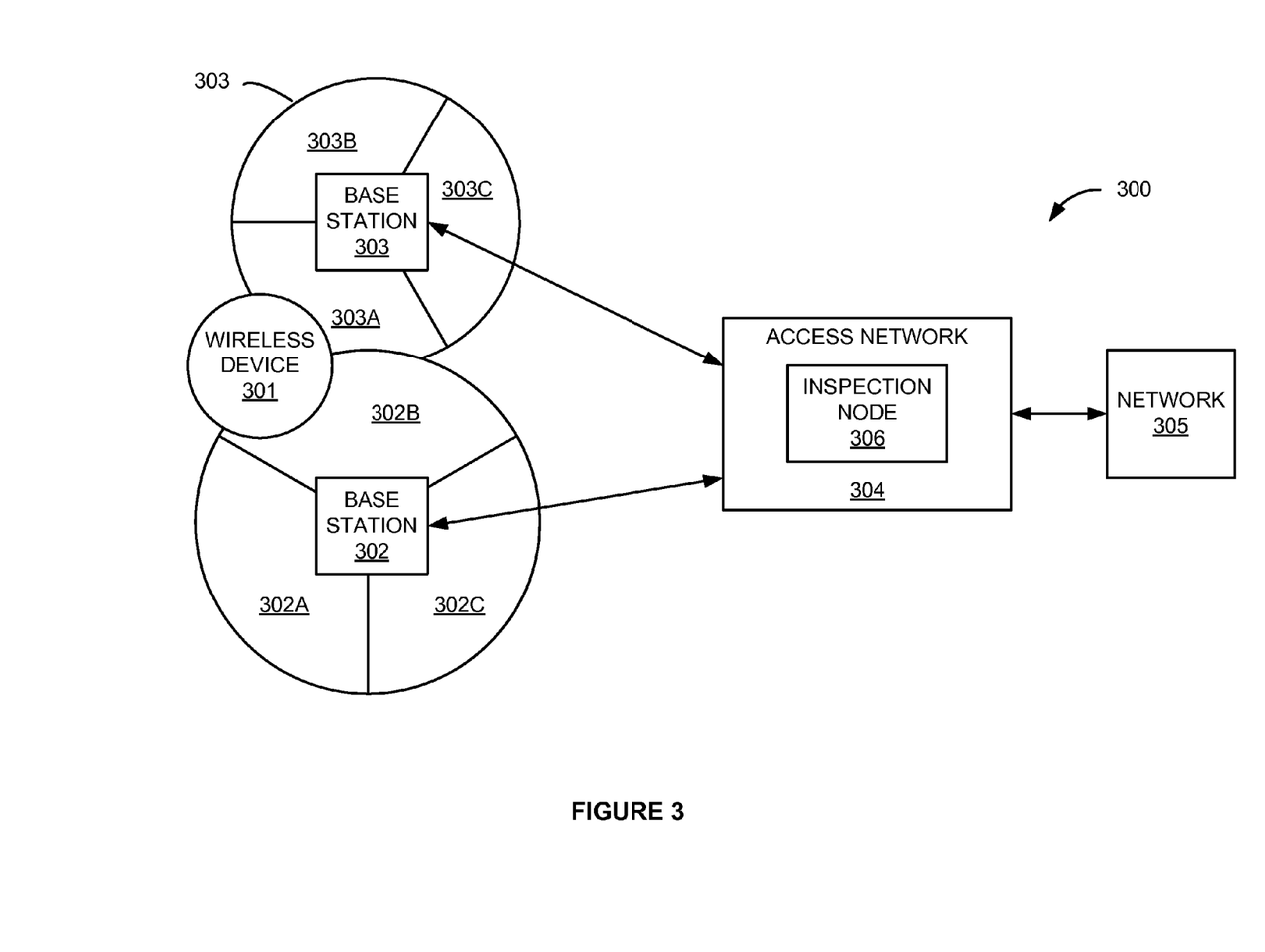
FIG. 3 is a block diagram illustrating a wireless communication system.

FIG. 3 is a block diagram illustrating wireless communication system 300. Wireless communication system 300 comprises wireless device 301, base station 302, base station 303, access network 304, network 305 and inspection node 306. Base station 302 includes sectors 302A, 302B and 302C and base station 303 includes sectors 303A, 303B and 303C. Wireless device 301 is illustrated as being in a coverage area with base stations 302 and 303 through sectors 302B and 303A respectively. Wireless device 301 may communicate with base stations 302 and/or 303 through alternative coverage areas utilizing base stations' 302 and 303 other sectors.

Base stations 302 and 303 exchange information with access network 304 and access network 304 exchanges information with network 305. Thus, a communication path is established between wireless device 301 and network 305. Inspection node 306 is shown as part of access network 304, however, inspection node 306 may be located in an alternative location of wireless communication system 300 that provides access to communication traffic between base stations 302 and 303 and network 305.

Figure 4:
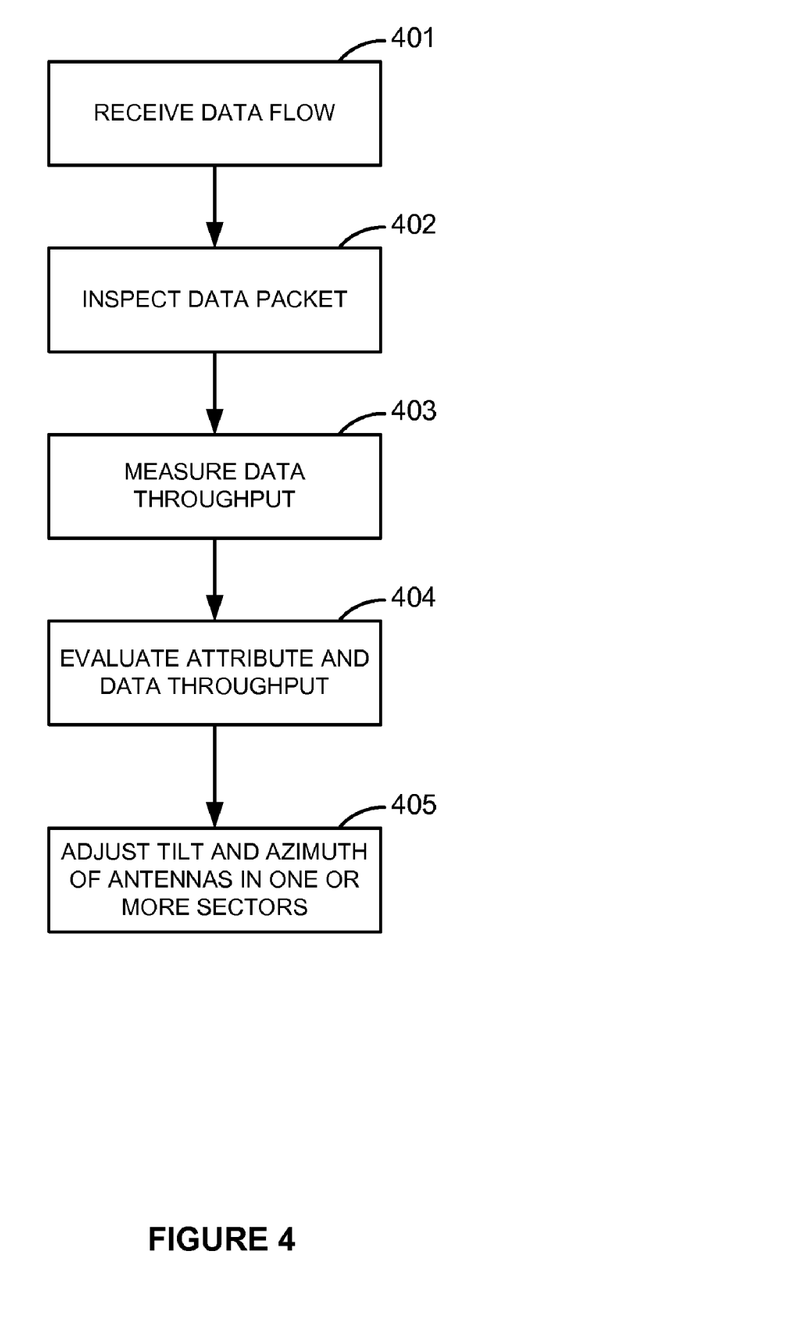
FIG. 4 is a flow diagram illustrating a method of operating a wireless communication system.

In operation, FIG. 4 is a flow diagram illustrating a method of operating wireless communication system 300. Inspection node 306 receives an application data flow that originated with wireless device 301 that is sent via base station 302 (401). Note that in this example, wireless device 301 is in the coverage area of sector 302B of base station 302 and sector 303A of base station 303. An application data flow can be any one-way or two-way data communication between wireless device 301 and network 305 that provides communication access to other users, applications and devices. Examples of these application flows may include but are not limited to telephone service, long distance service, mobile voice service, mobile data service, push-to-talk service, internet service, web browsing, email, peer-to-peer file sharing, pictures, picture messaging, video, video messaging, audio, voicemail, music, MP3's, ring tones, stock tickers, news alerts, and so on.

The application data flow comprises a plurality of data packets where each of the data packets may have application signatures or attributes that are associated with the data packet. For example, a data packet typically contains multiple header information and payload data that is associated with the headers. Within the payload of the data packets, attributes exist that provide information on the type of application that the data packet is associated with. For example, the data packet may include one or more of: (1) a user indicator that is associated with a user of the wireless device; (2) an application indicator that is associated with an application that originated the data packet; (3) a device indicator that is associated with a wireless device that originated or is going to receive the data packet; and, (4) a base station indicator that is associated with a wireless network resource that will, or has, carried the data packet. Additional attributes may also be included.

The location of wireless device 301 may be obtained using any number of techniques that is then passed on to inspection node 306. These techniques may include using global positioning system (GPS) data, cell tower triangulation data, call measurement data, pilot strength measurement data and other data that would allow the base station to communicate the location of wireless device 301 to inspection node 306. The location data may be passed to inspection node 306 through the application data flows themselves through the use of attributes discussed above.

Inspection node 306 performs a data packet inspection process on at least one of the data packets for at least one attribute from the application data flow (402). Also, inspection node 306 measures the throughput rate of the application data flow (403).

Inspection node 306 evaluates the attribute and the throughput against a network policy (404). The network policy may be associated with a particular type of application, with a service level agreement for a user, or with a profile for a wireless device.

Examples of network policies associated with an application could include a policy for a voice over internet protocol (VoIP) application, a peer-to-peer file sharing application, a web-browsing application, and any other application that may be run from a wireless device. Service level policies or agreements may be, for example, associated with a throughput rate cap that limits a wireless device or user, associated with a total amount of data (e.g., Gigabytes per month) that a wireless device or user is allowed to receive (or send) over a given time period, or associated with an amount of data a wireless device or user may use for a particular type of application (i.e. a user policy may limit the use of an application so that no more than 10% of that data can be associated with a certain application).

A quality of service (QoS) profile associated with a user account utilizing the communication system is another example of a network policy that may be evaluated by inspection node 306. A user account may include any information about a subscriber utilizing the communication system illustrated in FIG. 3. Examples of subscriber information would include identity information, the type of subscription plan or contract, credit information, and other information that would be typically associated with a wireless subscription with a network operator. The user account could also include a QoS profile for the user account. The QoS profile comprises permissions and restrictions for use of the communication system or network for the user to utilize services on the network. Criteria that may be analyzed for determining a QoS profile include throughput, packet error rate, delay and jitter that may be associated with the use of an application on the network. Network operators may utilize QoS profiles to establish levels of service for their subscribers. For example, one measure that may be utilized is a bandwidth parameter, criteria or threshold that would determine the permitted use of a network's resources by a user's application.

When the attribute and throughput meet the network policy, inspection node 306 sends a wireless communication adjustment notification message to base station 302. This notification message instructs base station 302 to make adjustments to the RF signal or coverage area serving wireless device 301 by altering the antenna patterns in the sector serving wireless device 301—in this case sector 302B of base station 302 (405). This allows wireless device 301 to receive enhanced or diminished wireless service depending upon the network policy being enforced.

Additionally, inspection node 306 may also send a wireless adjustment notification message to all base stations that have the ability to serve wireless device 301. In this example, inspection node 306 could send an adjustment message to base station 303 instructing the base station to alter the antenna pattern in sector 303A. This would allow the application data flow from wireless device 301 to be off-loaded onto another base station—in this case, to sector 303A of base station 303.

In an example, if wireless device 301 is using a high-throughput application like a peer-to-peer file sharing application, inspection node 306 would identify the application and throughput of the data flow as described above, evaluate the QoS policy for the application and device, and send instructions to the base stations that have the ability to serve wireless device 301 to make the adjustments to optimally serve all wireless devices in the coverage area. This may include moving wireless device 301 to another sector or moving other wireless devices in the sector to another sector to lessen the traffic load of the sector.

Altering the antenna patterns in a coverage area may be accomplished by altering the antenna vertically, the antenna's tilt, or altering the antenna horizontally, the antenna's azimuth, or a combination of both. Adjustments to the antenna may be made mechanically or electrically. For example, the antenna may be physically moved to alter its tilt and/or azimuth settings. Alternatively, electrical beam adjustment may be utilized to adjust the tilt and azimuth settings.

Further, adjustments may be made to the antenna from a location remote to the physical location of the antenna that may be residing atop a tower. Remote electrical tilt (RET) and remote azimuth tile (RAT) are examples of adjusting the antenna's tilt and azimuth settings from a location different from the antenna's location. This allows network operators to adjust the RF characteristics that influence capacity, coverage and other components needed to provide wireless services to wireless devices.

Figure 5:
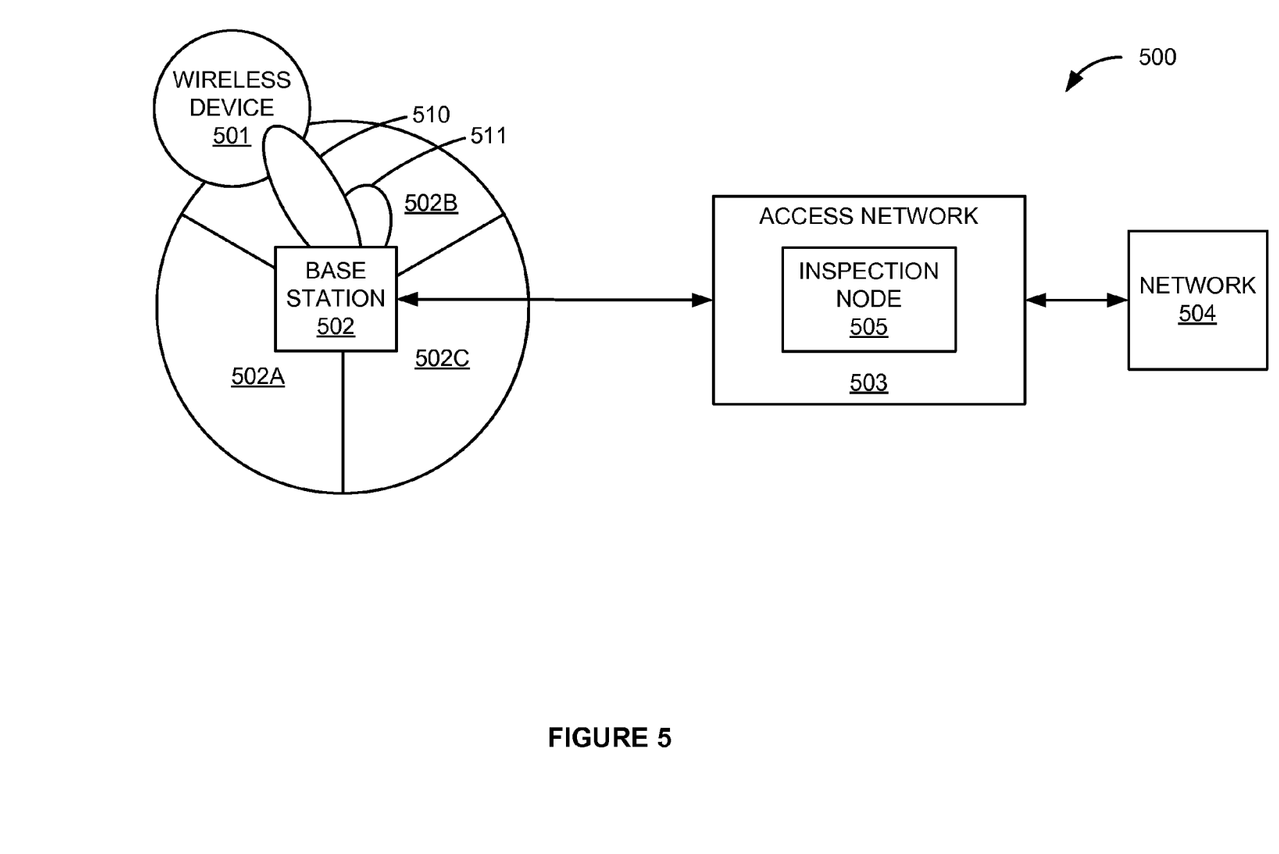
FIG. 5 is a block diagram illustrating a wireless communication system.

FIG. 5 is a block diagram illustrating wireless communication system 500. Wireless communication system 500 comprises wireless device 501, base station 502, access network 503, network 504 and inspection node 505. Base station 502 includes sectors 502A, 502B and 502C. Wireless device 501 is illustrated as being in a coverage area with base station 502 through sectors 502B. Wireless device 501 may communicate with base station 502 and/or other base stations through alternative coverage areas utilizing base station's 502 other sectors.

Base station 502 exchanges information with access network 503 and access network 503 exchanges information with network 504. Thus, a communication path is established between wireless device 501 and network 504. Inspection node 505 is shown as part of access network 503, however, inspection node 505 may be located in an alternative location of wireless communication system 500 that provides access to communication traffic between base station 502 and network 504.

Figure 6:
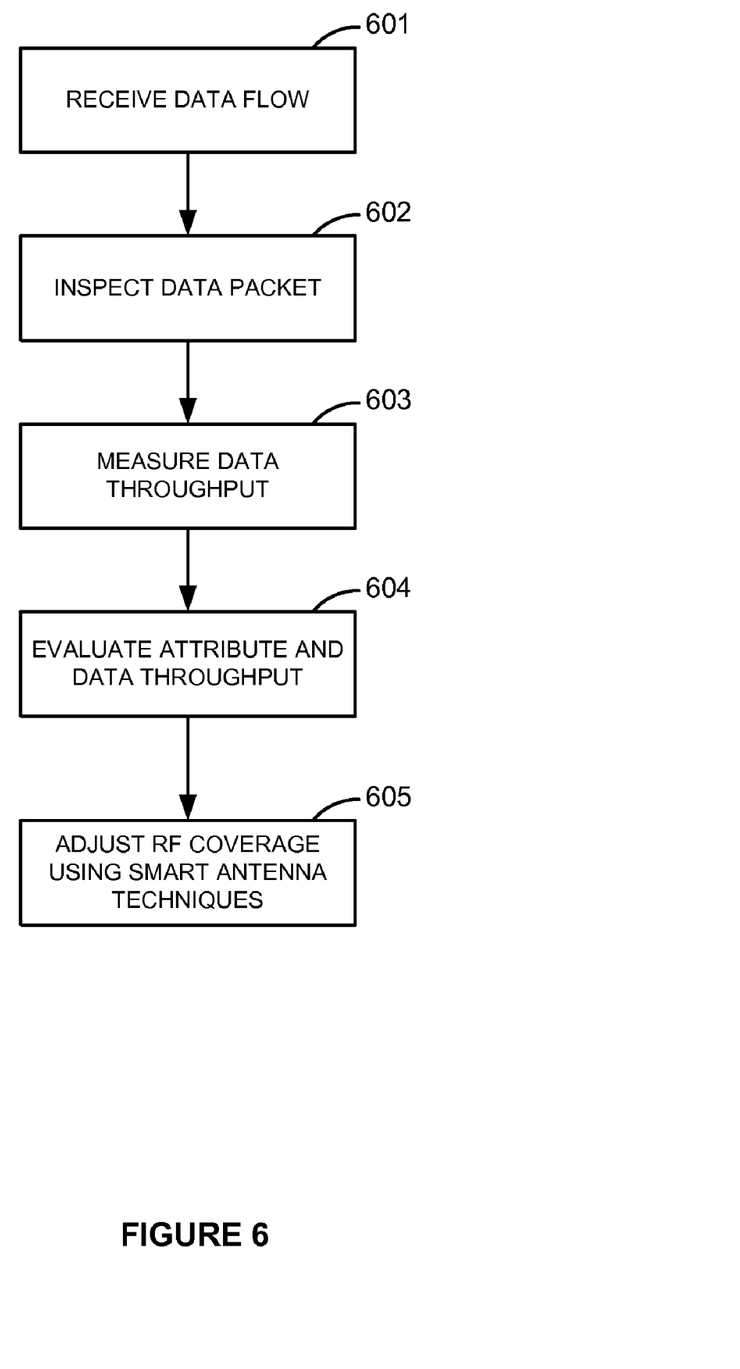
FIG. 6 is a flow diagram illustrating a method of operating a wireless communication system.

In operation, FIG. 6 is a flow diagram illustrating a method of operating wireless communication system 500. Inspection node 505 receives an application data flow that originated with wireless device 501 that is sent via base station 502

(601). Note that in this example, wireless device 501 is in the coverage area of sector 502B of base station 502. An application data flow can be any one-way or two-way data communication between wireless device 501 and network 504 that provides communication access to other users, applications and devices. Examples of these application flows may include but are not limited to telephone service, long distance service, mobile voice service, mobile data service, push-to-talk service, internet service, web browsing, email, peer-to-peer file sharing, pictures, picture messaging, video, video messaging, audio, voicemail, music, MP3's, ring tones, stock tickers, news alerts, and so on.

The application data flow comprises a plurality of data packets where each of the data packets may have application signatures or attributes that are associated with the data packet. For example, a data packet typically contains multiple header information and payload data that is associated with the headers. Within the payload of the data packets, attributes exist that provide information on the type of application that the data packet is associated with. For example, the data packet may include one or more of: (1) a user indicator that is associated with a user of the wireless device; (2) an application indicator that is associated with an application that originated the data packet; (3) a device indicator that is associated with a wireless device that originated or is going to receive the data packet; and, (4) a base station indicator that is associated with a wireless network resource that will, or has, carried the data packet. Additional attributes may also be included.

The location of wireless device 501 may be obtained using any number of techniques that is then passed on to inspection node 505. These techniques may include using global positioning system (GPS) data, cell tower triangulation data, call measurement data, pilot strength measurement data and other data that would allow the base station to communicate the location of wireless device 501 to inspection node 505. The location data may be passed to inspection node 505 through the application data flows themselves through the use of attributes discussed above.

Inspection node 505 performs a data packet inspection process on at least one of the data packets for at least one attribute from the application data flow (602). Also, inspection node 306 measures the throughput rate of the application data flow (603).

Inspection node 505 evaluates the attribute and the throughput against a network policy (604). The network policy may be associated with a particular type of application, with a service level agreement for a user, or with a profile for a wireless device.

Examples of network policies associated with an application could include a policy for a voice over internet protocol (VoIP) application, a peer-to-peer file sharing application, a web-browsing application, and any other application that may be run from a wireless device. Service level policies or agreements may be, for example, associated with a throughput rate cap that limits a wireless device or user, associated with a total amount of data (e.g., Gigabytes per month) that a wireless device or user is allowed to receive (or send) over a given time period, or associated with an amount of data a wireless device or user may use for a particular type of application (i.e. a user policy may limit the use of an application so that no more than 10% of that data can be associated with a certain application).

A quality of service (QoS) profile associated with a user account utilizing the communication system is another example of a network policy that may be evaluated by inspection node 505. A user account may include any information about a subscriber utilizing the communication system illustrated in FIG. 5. Examples of subscriber information would include identity information, the type of subscription plan or contract, credit information, and other information that would be typically associated with a wireless subscription with a network operator. The user account could also include a QoS profile for the user account. The QoS profile comprises permissions and restrictions for use of the communication system or network for the user to utilize services on the network. Criteria that may be analyzed for determining a QoS profile include throughput, packet error rate, delay and jitter that may be associated with the use of an application on the network. Network operators may utilize QoS profiles to establish levels of service for their subscribers. For example, one measure that may be utilized is a bandwidth parameter, criteria or threshold that would determine the permitted use of a network's resources by a user's application.

When the attribute and throughput meet the network policy, inspection node 306 sends a wireless communication adjustment notification message to base station 502. This notification message instructs base station 502 to make adjustments to the RF signal or coverage area serving wireless device 301 by altering the RF patterns in the sector serving wireless device 501—in this case sector 502B of base station 502 (605). This allows wireless device 501 to receive enhanced or diminished wireless service depending upon the network policy being enforced.

In an example, if wireless device 501 is using a high-throughput application like a peer-to-peer file sharing application, inspection node 505 would identify the application and throughput of the data flow as described above, evaluate the QoS policy for the application and device (or the user associated with the device), and send instructions to the base stations that have the ability to serve wireless device 501 to make the adjustments to optimally serve all wireless devices in the coverage area.

In this example, altering the antenna patterns in a coverage area is accomplished using smart antennas or adaptive array antennas. These antenna arrays use signal processing algorithms to calculate and create beamforming vectors that track and locate the antenna beam on the wireless device. These beamforming vectors are illustrated as vectors 510 and 511 in FIG. 5. If wireless device 501 is associated with high QoS subscriber, inspection node 505 would trigger base station's 502 smart antenna beam forming algorithm so that wireless device would receive stronger RF signals. Beamforming methods and techniques may be utilized using any number of antenna arrays including switched beam smart antennas, adaptive array smart antennas and others.

Referring now back to FIGS. 1, 3 and 5, communication systems 100, 300 and 500 may comprise any wireless network that provides communication connectivity for wireless devices 101, 301 and 501 to communication with other users. Wireless network protocols that may be utilized by communication systems 100, 300 and 500 may include code division multiple access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), General Packet Radio Services (GPRS), Worldwide Interoperability for Microwave Access (WiMAX) and the like.

Wireless devices 101, 301 and 501 comprise Radio Frequency (RF) communication circuitry and an antenna. The RF communication circuitry typically includes an amplifier, filter, modulator, and signal processing circuitry. Wireless devices 101, 301 and 501 may also include a user interface, memory device, software, processing circuitry, or some other communication components. Wireless devices 101, 301 and 501 could include telephones, smartphones, mobile phones, cellular phones, personal digital assistants (PDAs), personal communicators, handheld game consoles, personal computers (PCs), Ultra-Mobile personal computers (UMPCs), e-books, mobile Internet appliances, wireless network interface cards, handheld televisions and any other consumer appliance with wireless communication capabilities—including combinations thereof.

Base stations 102, 302, 303, and 502 may be any wireless system that provides the air interface to wireless devices and communication connectivity to the communication network. Examples of base stations that may be utilized include base station transceivers (BTSs), base station controllers (BSCs), base station (BSs), radio base stations (RBSs), Node B, enhanced Node B (eNBs) and others. Base stations 102, 302, 303, and 502 may include a number of elements known to those skilled in the art comprising a transceiver, power amplifier, combiner, duplexer, antenna and control function. Further, base stations 102, 302, 303, and 502 may comprise one antenna or multiple antennas having corresponding sectors and frequency assignments. Base stations 102, 302, 303, and 502 may have several transceivers and corresponding antennas which allow it to serve several different frequencies and different sectors of the base station.

Base stations 302, 303 and 502 are shown as being subdivided into a number of fields or sectors where each may be illuminated from an antenna directive or panel (not shown), that is an antenna that does not illuminate in all the directions, but instead concentrates the energy within a particular sector. Base stations that do not have sectors may be characterized by having omni-directional or unidirectional antennas that radiate energy in all directions.

Access networks 103, 304, and 503 provide communication connectivity and acts as an aggregator of traffic or interworking device between their respective base stations and networks and any other access nodes, base stations or base station controllers and networks. Examples of network elements that may be part of access networks 103, 304 and 503 may include an access service network gateway (ASN-GW), wireless local access network access gateway (WAG), packet data gateway (PDG), serving GPRS support node (SGSN), mobile switching center (MSC) and packet data serving node (PDSN).

Networks 104, 305 and 504 may be any network or collection of networks that couple, link, or otherwise operatively connect their respective access networks with other devices or systems. Networks 104, 305 and 504 may include other secondary data networks. In an example, networks 104, 305 and 504 may include a backhaul network, a local network, a long distance network, a packet network, the internet, or any combination thereof, as well as other types of networks.

Networks 104, 305 and 504 include multiple network elements to facilitate communication between gateways and other communication networks. These may include elements that perform network management functions. Examples of network management functions comprise controlling, planning, allocating, deploying, coordinating, and monitoring the resources of a network, including performing functions such as initial network planning, frequency allocation, predetermined traffic routing to support load balancing, cryptographic key distribution authorization, configuration management, fault management, security management, performance management, bandwidth management, and accounting management. Elements that may perform management functions comprise authentication servers, provisioning servers, security servers, billing platforms and any other platform that enables a network provider to manage its network. They may also maintain subscriber information associated with users that have permission to utilize their respective communication systems.

Networks 104, 305 and 504 may also utilize other network elements to provide data connectivity to other networks. Examples of these network elements comprise networking routers such as home agents (HAs) and foreign agents (FAs).

Inspection processing system 105 and inspection nodes 306 and 505 comprise a device or collection of devices capable of reading data packets from a data flow, inspecting one or more of the a packets for application signatures or attributes, determining policy breaches, and generating policy enforcement notifications to various network elements. Inspection processing system 105 and inspection nodes 306 and 505 could include processing circuitry and other processing components. Typical examples are microprocessors, integrated circuits, application specific integrated circuits, call processing systems, computers, servers, or other types of processing systems. Inspection processing system 105 and inspection nodes 306 and 505 may interface to and provide services to multiple communication network elements. Further, they may reside in a single device or may be distributed across multiple devices or locations within their respective communication systems.

An example of inspection processing system 105 and inspection nodes 306 and 505 could be a deep packet inspection (DPI) system. DPI systems have the capability of looking into the payload of an application packet or traffic stream and make decisions regarding the data based upon the content of the data. One skilled in the art would understand that any number of methods and processes may be used to accomplish this task. These may include using signature-matching technology along with heuristic analysis of the data in order to determine the impact of that traffic stream on the network. DPI differs from other packet inspection processes in that DPI also examines the payload in the data packet. Other techniques, such as stateful packet inspection, typically only inspect the header information. As such, DPI techniques can examine data packets at layer 2 through layer 7 of the Open Systems Interconnection (OSI) model, typically focusing on the application layer or layer 7.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system comprising:

in a base station, exchanging data packets for an application with a wireless device of a user;

in a packet inspection system, inspecting the data packets including their payloads to determine: a user indicator for the user, an application indicator for the application, a geographic location for the wireless device, and a data rate for the data packets;

in a packet inspection system, processing the user indicator, the application indicator, the geographic location, and the data rate to determine an RF signal adjustment for the base station and to transfer an adjustment notification indicating the RF signal adjustment to the base station;

in the base station, receiving the adjustment notification, and in response, implementing the RF signal adjustment.

2. The method of claim 1 wherein the application comprises at least one of: voice telephony, push-to-talk, email, video service, audio service, and peer-to-peer file sharing.

3. The method of claim 1 wherein implementing the RF signal adjustment comprises modifying an RF coverage area.

4. The method of claim 1 wherein implementing the RF signal adjustment comprises modifying an RF coverage area through antenna array beam forming.

5. The method of claim 1 further comprising, in the packet inspection system, processing the user indicator and the application indicator to determine a Quality-of-Service (QoS) profile for the user and the application and processing the QoS profile and the data rate to determine the RF signal adjustment.

6. A wireless communication system comprising:
a base station configured to exchange data packets for an application with a wireless device of a user;
a packet inspection system configured to inspect the data packets including their payloads to determine: a user indicator for the user, an application indicator for the application, a geographic location for the wireless device, and a data rate for the data packets;
the packet inspection system further configured to process the user indicator, the application indicator, the geographic location, and the data rate to determine an RF signal adjustment for the base station and to transfer an adjustment notification indicating the RF signal adjustment to the base station;
the base station further configured to receive the adjustment notification, and in response, implement the RF signal adjustment.

7. The wireless communication system of claim 6 wherein the application comprises at least one of: voice telephony, push-to-talk, email, video service, audio service, and peer-to-peer file sharing.

8. The wireless communication system of claim 6 wherein the RF signal adjustment comprises modifying an RF coverage area.

9. The wireless communication system of claim 6 wherein the RF signal adjustment comprises modifying an RF coverage area through antenna array beam forming.

10. The wireless communication system of claim 6 wherein the packet inspection system is configured to process the user indicator and the application indicator to determine a Quality-of-Service (QoS) profile for the user and the application and process the QoS profile and the data rate to determine the RF signal adjustment.

* * * * *